Aug. 30, 1938.

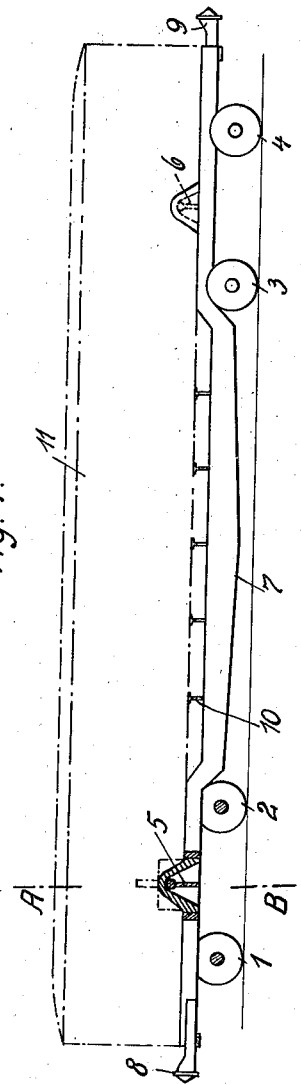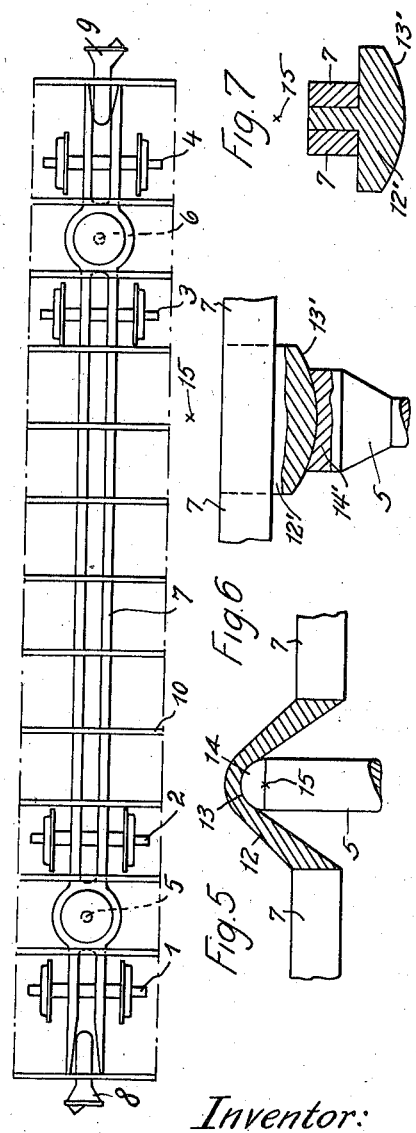

LOUIS-EUGÈNE-WIDOLT MONTROSE-OSTER 2,128,756

VEHICLE SUSPENSION

Filed Dec. 10, 1932

Inventor:
Louis-Eugène-Widolt Montrose-Oster
by Allan Hall
his Atty.

Patented Aug. 30, 1938

2,128,756

UNITED STATES PATENT OFFICE 2,128,756

VEHICLE SUSPENSION

Louis-Eugène-Widolt Montrose-Oster, Karlsbad, Czechoslovakia, assignor of one-half to the firm Pollopas Patents Ltd., London, England Application December 10, 1932, Serial No. 646,698
In Germany December 14, 1931

6 Claims. (Cl. 105—453)

The subject of this invention is an improved suspension for vehicles, constituting in effect a floating suspension of the vehicle body.

According to the invention the under-frame of the vehicle body is suspended at two points located in the line of the central longitudinal axis of the wheeled structure irrespective of the nature of the wheeled structure. In practice, the bearing surfaces of the wheeled structure and the corresponding bearing surfaces of the vehicle body are formed as parts of spheres (balls and sockets), the centres of curvature of which constitute virtual supporting points or fulcra of suspension. In this connection it is immaterial whether the bearing faces of the ball and socket elements are located above or below the virtual supporting points, as the location is more or less a matter of convenience.

The new suspension acts after the fashion of a cradle, swaying on the imaginary line connecting the above mentioned fulcra as a longitudinal axis. All the stresses due to the weight, tension, shock and the like are confined to a single plane, namely, the vertical central longitudinal plane. Torsional stresses are not experienced with the two-point suspension. As the centre of gravity is located beneath the line connecting the virtual supporting or suspension points, when travelling over curves or bends, the suspended portion of the vehicle automatically rocks through an angle depending on the actual speed. Shocks and jerks external to the central longitudinal plane can no longer act directly on the suspended portion of the vehicle. On the other hand, the position of the centre of gravity relatively to the line connecting the virtual supporting points practically allows travel over curves at any desired speed, irrespective of whether there is no super-elevation or too great or too small a super-elevation of the track.

In the accompanying drawings

Fig. 1 is a side elevation, partly in section, of a railway car built according to this invention.

Fig. 2 is a plan view of the same,

Fig. 3 is a section on the line A—B of Fig. 1,

Fig. 4 the same section as shown in Fig. 3, showing the vehicle traveling over a right-hand curve.

Figs. 5, 6 and 7 detail views on an enlarged scale of certain parts of the vehicle.

Figure 8:
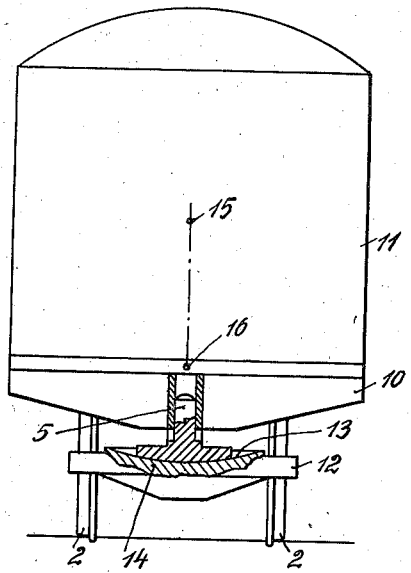
Figure 9:
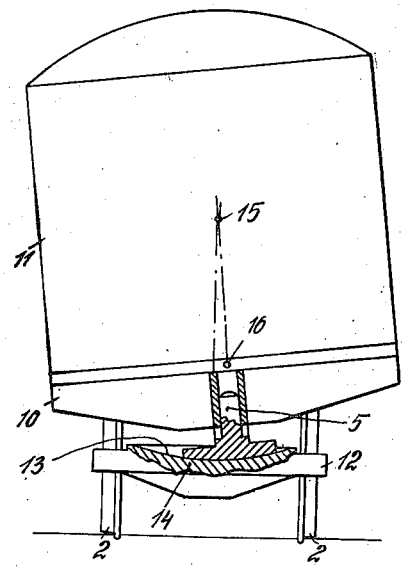
Figure 10:
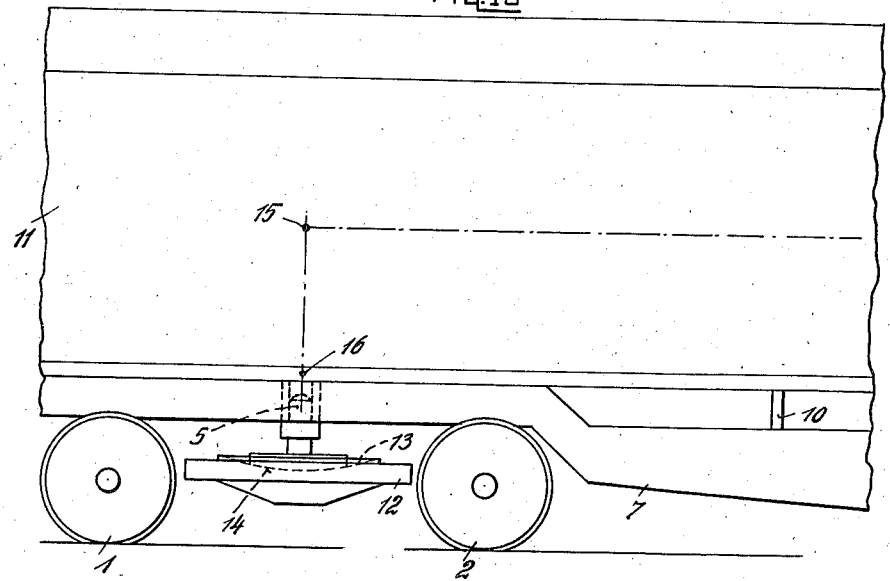

Fig. 8 is a partly elevational and partly sectional view of a railway box-car moving over a straight track, Fig. 9 a similar view of the same moving over a left-hand curve, and Fig. 10 a fractional side-elevational view of the same.

Referring to the drawings, 1, 2, 3 and 4 represent the sets of wheels of the bogies which are otherwise not shown in detail. Each bogie is provided with pivots 5 and 6. On the pivots 5 and 6 rests the beamlike underframe 7. The front and rear ends of the under-frame are provided with central buffers 8, 9. At the location of the pivots the member 7 is arched to accommodate the pivots. The vehicle body proper 11 is supported on cross beams 10 in the usual manner. 12 denotes the bearing portion of the member 7 presenting a ball socket 13. 14 denotes the complementary ball portion of the pivot 5. 15 represents the virtual suspension or supporting points. 16 denotes the center of gravity of the superstructure without load.

The parts 12', 13', and 14' of Figs. 6-8 correspond to the parts 12, 13 and 14 of Fig. 5.

It is also possible so to construct the two-point suspension that the centre of gravity of the body is located above the line connecting the virtual supporting points, for example, by means of a freely suspended pendulous member acting on a control device operated by compressed air or the like.

The invention is also capable of embodiment in other constructions in which the vehicle under-frame is supported by the wheeled structure at two points only.

As is understood, it is possible to provide any suitable arrangement of linkages between the under-frame and the wheeled structure, which linkages may serve, for example, for the control of auxiliary fittings or the like. In this respect there is no departure from the principle of the invention provided that the underframe and the wagon body are not prevented from adjusting themselves directly or indirectly under the action of gravity which is a necessary consequence of the two-point suspension.

Although the drawings show the under-frame as being supported by means of balls and sockets, the bearing faces may be formed as rolling faces. It is also possible to provide roller bearings or point bearings at the points of suspension. Also the use of ball bearing systems is not excluded. Although the drawings show the pivots supporting the under-frame as constituted by ball-shaped heads, it is obvious that pivot members with roller-shaped heads may be used and that such roller-shaped heads may be associated with roller bearings or point bearings.

What I claim is:—

1. A railway vehicle, particularly for standard track and rolling stock, comprising a wheeled structure and a body consisting of an underframe and a superstructure on said underframe, means on said wheeled structure coacting with means located in the space encompassed by said underframe, in the central vertical longitudinal plane of said vehicle, for supporting said body at two points only in such a manner that the said whole body comprising underframe and superstructure may swing freely about the axis constituted by the imaginary line connecting said supporting means, said underframe being considerably heavier than said superstructure so as to lower the center of gravity sufficiently to prevent, for practical purposes, the tipping over of said body, without the necessity of additional means confining its free swinging movement.

2. A vehicle, particularly for railways, comprising a body and a plurality of independently pivoted wheeled bogies supporting said body, an underframe for said body, a superstructure rigidly connected to said underframe, and means for suspending said underframe over the said wheeled structure at two points only, located within the space encompassed by said underframe, in the central vertical longitudinal plane of said vehicle, in such a manner that the said body may swing freely about the axis constituted by the imaginary line connecting said suspension means, said underframe being considerably heavier than said superstructure so as to lower the center of gravity sufficiently to prevent, for practical purposes, the tipping over of said body, without the necessity of additional means confining its free swinging movement.

3. A railway vehicle as claimed in claim 1, in which the underframe is supported on the wheeled structure system by means of two pairs of ball and socket joints the center of each of which constitutes a virtual supporting point within the space encompassed by said underframe, in the central vertical longitudinal plane of said vehicle, in such a manner that said body may swing freely about the axis constituted by the imaginary line connecting said virtual supporting points independent of the angle formed by the longitudinal axis of the bogie with the longitudinal axis of the body.

4. A railway vehicle as claimed in claim 2, in which the underframe is suspended over the wheeled structure system by means of only two sets of ball and socket joints the center of each of which constitutes a virtual suspension point located within the space encompassed by said underframe, in such a manner that the said body may swing freely about the axis constituted by the imaginary line connecting said virtual suspension points independent of the angle formed by the longitudinal axis of the bogie with the longitudinal axis of the body.

5. A standard railway vehicle as claimed in claim 2, in which the underframe is suspended over the wheeled structure system by means of two sets of ball and socket joints having bearing faces located above the virtual suspension points constituted by the centers of said joints in such a manner that the said body may swing freely about the axis constituted by the imaginary line connecting said virtual suspension points independent of the angle formed by the longitudinal axis of the bogie with the longitudinal axis of the body.

6. A railway vehicle as claimed in claim 1, in which the underframe is supported over the wheeled structure by means of ball and socket joints located within the space encompassed by said underframe in the central vertical longitudinal plane of said vehicle, said balls and sockets having bearing surfaces located below the virtual supporting points constituted by the centers of said joints so that the said body may swing freely about the axis constituted by the imaginary line connecting said virtual supporting points independent of the angle formed by the longitudinal axis of the bogie with the longitudinal axis of the body.

LOUIS-EUGÈNE-WIDOLT
 MONTROSE-OSTER.